United States Patent [19]
Otsuki et al.

[11] Patent Number: 5,545,959
[45] Date of Patent: Aug. 13, 1996

[54] SPEED CONTROL METHOD FOR A NUMERICAL CONTROL APPARATUS

[75] Inventors: Toshiaki Otsuki, Nishikatsura-machi; Haruhiko Kozai; Seiji Ishii, both of Oshino-mura, all of Japan

[73] Assignee: Fanuc Ltd., Japan

[21] Appl. No.: 373,208

[22] PCT Filed: May 16, 1994

[86] PCT No.: PCT/JP94/00789

§ 371 Date: Jan. 19, 1995

§ 102(e) Date: Jan. 19, 1995

[87] PCT Pub. No.: WO94/28472

PCT Pub. Date: Dec. 8, 1994

[30] Foreign Application Priority Data

May 20, 1993 [JP] Japan .................................. 5-139824

[51] Int. Cl.$^6$ .................. G05B 19/41; G06G 7/64
[52] U.S. Cl. ............... 318/568.15; 318/573; 318/568.11; 364/474.28; 364/474.31
[58] Field of Search .......................... 318/568.15, 568.12, 318/568.17, 572, 573, 632, 568.11, 568.22; 364/474.28, 474.31, 474.34

[56] References Cited

U.S. PATENT DOCUMENTS

| | | | |
|---|---|---|---|
| 3,593,091 | 7/1971 | Ross | 318/572 |
| 4,663,726 | 5/1987 | Chand et al. | 318/573 |
| 4,902,951 | 2/1990 | Ohta et al. | 318/632 |
| 5,438,522 | 8/1995 | Crovella | 318/568.15 |

FOREIGN PATENT DOCUMENTS 64-37604  2/1989  Japan.

*Primary Examiner*—John W. Cabeca
*Attorney, Agent, or Firm*—Staas & Halsey

[57] ABSTRACT

A speed control method for a numerical control apparatus of a machine tool which includes a rotational axis or axes changing a tool angle relative to a workpiece. The method obtains a distributive shift amount of each rotational axis, at every predetermined period, on the basis of positional data of each rotational axis with respect to start and end points of a shift command and a commanded shift speed; obtains, at every predetermined period, a positional deviation of a tip of the machine tool in a direction of each linear shift axis with reference to the rotational axis, based on a difference between a rotational position of the rotational axis in a next cycle and a rotational position of the rotational axis in a present cycle; for each linear shift axis, adds the positional deviation to the corresponding distributive shift amount, and outputs a resultant value as a corrected distributive shift amount for each linear shift axis; and for each rotational axis, outputs the obtained distributive shift amount.

4 Claims, 4 Drawing Sheets

SPEED CONTROL METHOD FOR A NUMERICAL CONTROL APPARATUS

BACKGROUND OF THE INVENTION

1. Field of the Invention

This invention relates to an improvement of speed control method for a numerical control apparatus.

2. Description of the Related Art

Generally known as a speed control method of a machine tool comprising a rotational axis and designed for being capable of varying an angle of its tool relative to a workpiece is to calculate the distributive shift amount in the same manner as in the case of calculation of the shift amount of the linear shift axis so that each axis can be controlled and driven in accordance with the calculated distributive shift amount.

This method is, for example, applied to a machine tool comprising five axes: a first rotational axis ("b" axis) for allowing a tool to rotate about a horizontal axis passing through a base of the tool, a second rotational axis ("c" axis) for allowing the tool to rotate about a vertical axis passing through the base of the tool, and shift axes X, Y and Z constituting orthogonal three axes, each for moving the tool in a direction orthogonal to other axes. In this case, assuming that a point (Sx, Sy, Sz) and another point (Ex, Ey, Ez) represent start and end points of a shift command with respect to a tool tip, respectively; "F" is a command shift speed; "Sb" and "Eb" represent rotational angles of the first rotational axis at the start and end points of the shift command; "Sc" and "Ec" represent rotational angles of the second rotational axis at the start and end points of the shift command; and "$\Delta T$" is a distribution period of each axis. On the premise that the distribution number of times for each axis is equal to those for others and an overall shift amount per distribution period is expressed in the form of a square root of a summation of square of a distributive shift amount of each axis, a distributive shift amount $\Delta B$ of the first rotational axis (b-axis), a distributive shift amount $\Delta C$ of the second rotational axis (c-axis), a distributive shift amount $\Delta Ux$ of the linear shift axis X, a distributive shift amount $\Delta Uy$ of the linear shift axis Y, and a distributive shift amount $\Delta Uz$ of the linear shift axis Z, are obtained ny solving the following simultaneous equations (1) and (2);

$$\frac{\Delta Ux}{Ex - Sx} = \frac{\Delta Uy}{Ey - Sy} = \frac{\Delta Uz}{Ey - Sy} = \quad (1)$$

$$\frac{\Delta B}{Eb - Sb} = \frac{\Delta C}{Ec - Sc}$$

$$\Delta T = \frac{\sqrt{\Delta Ux^2 + \Delta Uy^2 + \Delta Uz^2 + \Delta B^2 + \Delta C^2}}{F} \quad (2)$$

However, in the equations (1) and (2), the terms $\Delta B$ and $\Delta C$ have the dimension of angle. Furthermore, no consideration is given to the length of a tool. Thus, executing pulse distribution by dealing with these terms $\Delta B$ and $\Delta C$ in the same manner as in the case of the shift amount of a linear shift axis could not realize a control such that the shift speed of a tool tip conforms to the command shift speed.

In other words, such a pulse distribution only provides a means for controlling the drive operation of each axis by executing such a linear interpolation processing as applied only to linear shift axes, on the basis of start and end points of a shift command, rotational angles of respective axes at the start and end points of the shift command, a distribution period and a command shift speed as one control data, with the result that the substantial shift speed of the tool cannot be controlled by the command shift speed itself. On the other hands, in order to realize that the tool tip should move at a desired speed, the command shift speed for realizing the desired shift speed must be determined by taking account of the effects which variables, such as distributive shift amount $\Delta B$ and $\Delta C$ of the rotational axes, give to the actual shift speed of the tool tip. However, it is very difficult to obtain such a command shift speed with the above conventional method.

SUMMARY OF INVENTION

An object of the present invention is to provide a speed control method by a numerical control apparatus capable of accurately shifting a tool at a given command shift speed even if a tool angle relative to a workpiece is varied during the machining process.

In order to accomplish the above object, according to the speed control method by a numerical control apparatus of the present invention, in controlling the operating speed of a machine tool with rotational axes whose angles relative to a workpiece are variable, distributive shift amount of each axis for each predetermined period is obtained based on the position data of each axis with respect to the start point and end point of the shift command and command shift speed; position deviation in the direction of each linear shift axis to be generated at the tool tip with reference to the rotational axis is determined based on the difference between the rotational position of the rotational axis in the next period and the rotational position of the rotational axis in the present period for each predetermined period; for each linear shift axis, the positional deviation is added to corresponding distributive shift amount to output the corrected distributive shift amount of the linear shift axis; for each rotational axis, the obtained distributive shift amount is outputted.

It is preferable that, after a distributive shift amount of each linear shift axis at every predetermined period is obtained based on the positional data of the start and end points of the shift command and the command shift speed, a distributive shift amount of each rotational axis at every the predetermined period is obtained on the bases of the relationship between a shift distance of the shift command in the direction of one linear shift axis and a distributive shift amount of the linear shift axis at every predetermined period, and rotational positions of the rotational axis at the start and end points of the shift command.

Furthermore a second aspect of the present invention provides, in a speed control method for a numerical control apparatus, a method of commanding the speed of a tool tip of a tool controlled by the numerical control apparatus using one or more linear shift axes and one or more rotational axes, wherein:

(a) a linear interpolation is executed on the bases of a coordinate value on each linear shift axis of the tool tip and a rotational angle of each rotational axis at a start point of a shift command, a coordinate value on each linear shift axis of the tool tip and a rotational angle of each rotational axis at an end point of the shift command, and a command shift speed in the sections defined by the start and end points which are given by one block of a machining program, thereby obtaining a distributive shift amount of each linear shift axis and a distributive rotational amount of each rotational axis in advance;

(b) a rotational angle of the rotational axis at the present cycle is read to calculate the amount by which the tool tip is to be displaced in a direction of each linear shift axis with respect to the rotational center of the rotational axis if the read rotational angle varies in the next cycle by an amount equal to a distributive rotational amount obtained in the above step (a), and obtain a correction amount for each linear shift axis required to cancel the displacement;

(c) in the next cycle, outputting a distribution pulse equivalent to a resultant value by adding the distributive shift amount obtained in the above step (a) and the correction amount obtained in the above step (b), for each linear shift axis, while outputting a distribution pulse equivalent to the distributive rotational amount itself obtained in the above step (a), for each rotational shift axis, thereby controlling the tool tip in such a manner that the speed commanded by the machining program agrees with an actual speed of the tool tip at a machining point.

As described above, according to the method of the present invention, a distributive shift amount of each axis at every predetermined period based on the positional data at the start and end points of the shift command and the command shift speed, i.e. a distributive shift amount of each linear shift axis and a distributive shift amount of each rotational axis are determined. In the execution of the shift command, a positional deviation of the tool tip occurring along each linear shift axis due to a difference between a rotational position of the rotational axis in the next cycle and a rotational position of the rotational axis in the present cycle is obtained at every predetermined period. Then, for each linear shift axis, the distributive shift amount in each linear shift axis is added to the corresponding positional deviation, and the resultant value is outputted as the corrected distributive shift amount for each linear shift axis. For each rotational axis, previously obtained distributive shift amount is outputted to rotate all the rotational axes at the same speed. Thus, the tool tip is shifted at the command shift speed designated.

Since it is designed so that the distributive shift amount of each linear shift axis is corrected at every predetermined period in accordance with the positional deviation of the tool tip caused by rotation of each rotational axis, the tool tip can be moved at the given command shift speed in the same manner as in the case of the linear interpolation processing not including rotation of the rotational axis.

DETAILED DESCRIPTION OF THE PREFERRED EMBODIMENTS

Figure 1:
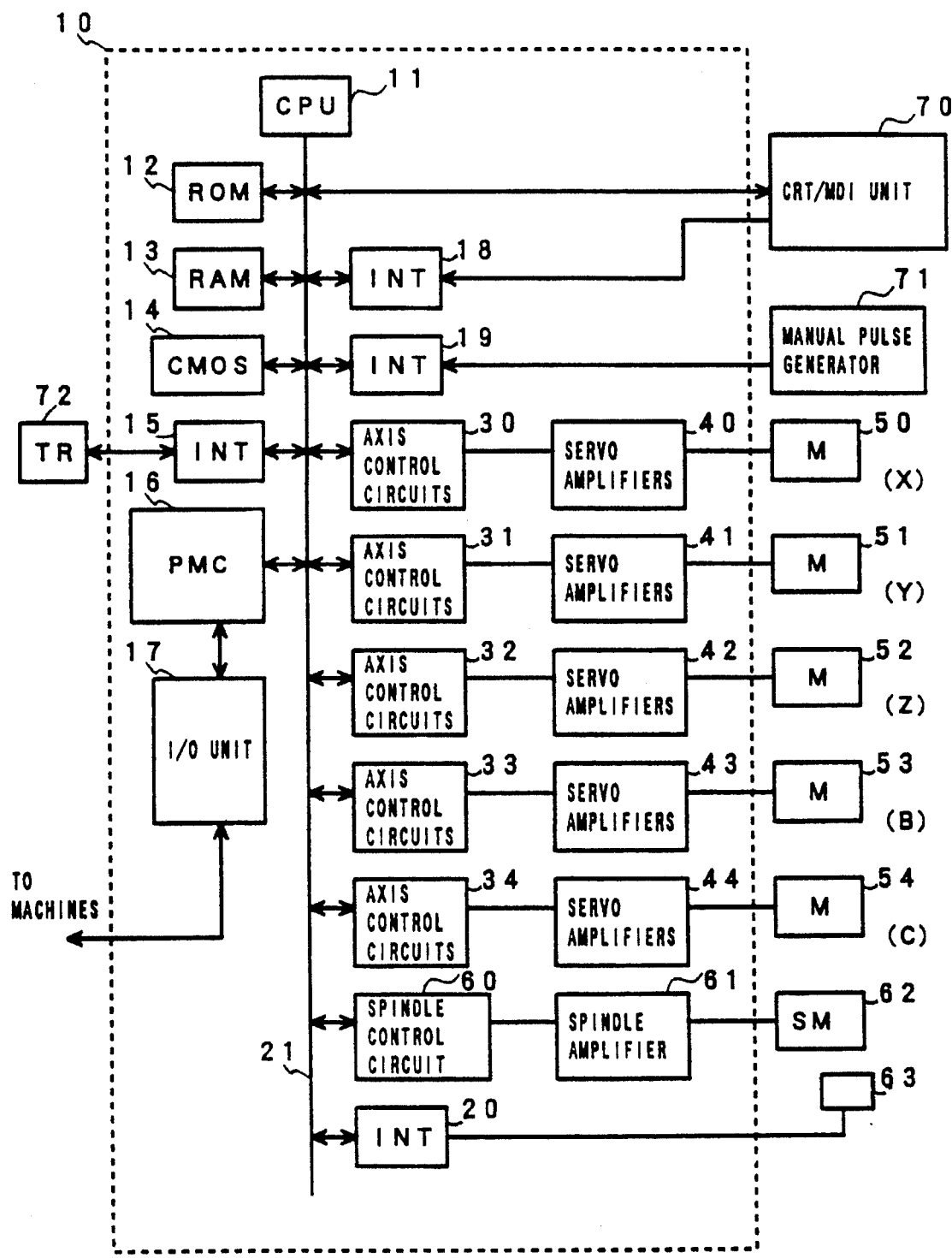
FIG. 1 is a block diagram showing a hardware of a numerical control apparatus in accordance with one embodiment of the method according to the present invention.

Hereinafter, a preferred embodiment of the present invention will be explained with reference to the accompanying drawings. FIG. 1 is a block diagram showing a hardware of a numerical control apparatus 10 relating to the method as an embodiment of the present invention. A processor 11, taking charge of the overall control of the control apparatus 10, reads out a system program stored in a ROM 12 via a bus 21 to execute the overall control of the control apparatus 10 according to this system program. A RAM 13 stores temporary calculation data, display data, and various data entered via a CRT/MDI unit 70 by an operator. A CMOS memory 14, backed up by a battery not shown, is constituted as a non-volatile memory for maintaining its memory condition even if the power of the control apparatus 10 is turned off, and stores machining programs read in via an interface 15 and machining programs or the like entered via the manual data input device (CRT/MDI unit) 70 with display unit. The ROM 12 stores in advance various system programs for executing an edit mode processing which is necessary for creating and editing machining programs or executing a reproduction mode processing which is used for automatic operation.

The interface 15, acting as an interface for external devices connectable to the control apparatus 10, is connected with an external device 72, such as a paper tape reader, a paper tape puncher and an external memory device. Machining programs are generally read in by means of the paper tape reader or the external memory device. On the other hand, the machining programs edited in the control apparatus 10 can be outputted to the paper tape puncher or the external memory device.

A PMC (programmable machine controller) 16 controls auxiliary devices of a machine tool, such as actuators like a robot hand for exchanging tools, in accordance with a sequence program stored in the control apparatus 10. More specifically, according to M function, S function and T function commanded by the machining program, the PMC 16 converts signals into the forms required for the auxiliary devices using the sequence program and outputs the converted signals to the auxiliary devices via an input/output (I/O) unit 17. Responding to the output signals, the auxiliary devices such as various actuators operate. Also, the PMC 16 receives signals sent from limit switches of the machine tool main body or the auxiliary devices and various switches of an operation board installed on the machine tool, and apply necessary processing to such signals to feed them to the processor 11.

Image signals, such as present position of respective axes of the machine tool, alarms, parameters, and image data are sent to the CRT/MDI unit 70 and displayed on the display screen of the CRT/MDI unit 70. The CRT/MDI unit 70 is a manual data input apparatus comprising a display unit and a keyboard. An interface 18 receives data entered through the keyboard of the CRT/MDI unit 70, and sends the data to the processor 11. An interface 19 is connected to a manual pulse generator 71 to receive pulses produced from the manual pulse generator 71. The manual pulse generator 71 is mounted on an operation board of the main body of the machine tool, so as to allow an operator to use it for controlling each axis of the machine tool based on distribution pulses determined by manual operation, thereby accurately determining the position of a movable portion of the machine tool.

Axis control circuits 30 to 34 receive shift commands of respective axes fed from the processor 11, and output these shift commands to servo amplifiers 40 to 44. The servo amplifiers 40 to 44 receive these shift commands and drive servo motors 50 to 54 of respective axes of the machine tool. In this case, the servo motors 50, 51 and 52 are used for driving linear shift axes X, Y and Z cooperatively shifting a table, while the servo motors 53 and 54 are used for driving a first rotational axis B and a second rotational axis C of a rotary head. Each of the servo motors 50 to 54 has a built-in pulse coder for detecting the position of each axis. A position signal from this pulse coder is fed back as a pulse train. If necessary, a linear scale can be used as a position detector. Furthermore, F/V (frequency/velocity) conversion of the pulse train will produce a speed signal. In FIG. 1 the explanations of the feedback of position signal and speed feedback are omitted.

A spindle control circuit 60 receives a spindle rotation command to be fed to the machine tool, and outputs a spindle speed signal to a spindle amplifier 61. The spindle amplifier 61, in response to this spindle speed signal, causes a spindle motor 62 of the machine tool to rotate at a command rotation speed for cutting. A position coder 63, connected to the spindle motor 62 by 10 means of a wheel, a belt, or the like, generates feedback pulses synchronously with rotation of the spindle. The feedback pulses, transmitted via the interface 20, are read by the processor 11.

Figure 4:
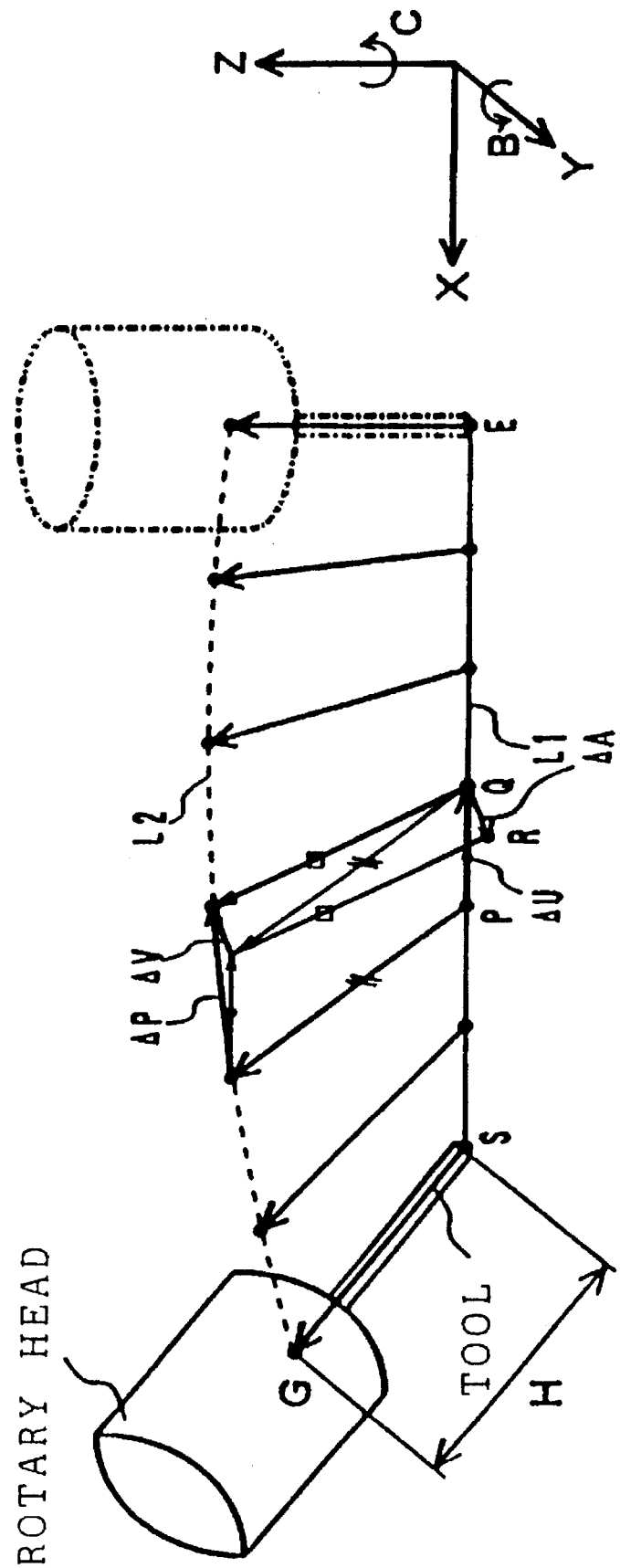
FIG. 4 is a view schematically illustrating the degree of freedom of a rotary head mounted on a machine tool.

FIG. 4 is a schematic view illustrating the degree of freedom of a rotary head installed in the machine tool driven and controlled by the control apparatus 10. This rotary head comprises the first rotational axis B for allowing a tool to rotate about a horizontal axis passing through a base of the tool and the second rotational axis C for allowing the tool to rotate about a vertical axis passing through the base of the tool as previously described, can freely change the tilting angle of the tool relative to a workpiece and its direction utilizing a composite tilting angle obtained by the rotational angles of the axes B and C, and makes a relative movement on the workpiece in response to a table feed motion along the linear shift axes X, Y and Z. In this embodiment, the first rotational axis B and the second rotational axis C intersect with each other at a rotational center G of the rotary head which corresponds to the base of the tool. "H" represents the distance from the rotational center G of the axes B and C to the tool tip.

Let us assume that (Sx, Sy, Sz) and (Ex, Ey, Ez) are coordinate values respectively representing a start point S and an end point E of a shift command with respect to a tool tip, which is given by the machining program of one block; "F" is a command shift speed of the tool tip; and "$\Delta T$" is a pulse distribution period. If the tool itself does not change the attitude, and a linear interpolation is made between the start point S and the end point E considering only the table feed motion generated by the linear shift axes X, Y and Z, then the following equation is derived, since the number of times of distribution for one axis is the same as for the other, assuming that $\Delta Ux$, $\Delta Uy$ and $\Delta Uz$ are distributive shift amounts of the linear shift axes X, Y and Z at every predetermined period $\Delta T$:

$$\frac{\Delta Ux}{Ex - Sx} = \frac{\Delta Uy}{Ey - Sy} = \frac{\Delta Uz}{Ez - Sz} \quad (3)$$

If the tool itself does not change its attitude, an overall shift amount per distribution period $\Delta T$ is completely identical with a square root of a summation of square of the distributive shift amounts $\Delta Ux$, $\Delta Uy$ and $\Delta Uz$ of respective axes, so that the following equation can be derived.

$$\Delta T = \frac{\sqrt{\Delta Ux^2 + \Delta Uy^2 + \Delta Uz^2}}{F} \quad (4)$$

Solution of the above simultaneous equations (3) and (4) will give each of the distributive shift amounts $\Delta Ux$, $\Delta Uy$ and $\Delta Uz$ per period $\Delta T$ as a result of the linear interpolation applied between the start point S and the end point E using only three axes of the linear shift axes X, Y and Z.

If the equation (3) includes a term whose denominator is "0", this term is deleted from the equation (3), and the equation (4) is solved regarding a value corresponding to the numerator of the above deleted term to be "0". In the case where there are two terms having a denominator value of "0" in the equation (3), these terms are deleted from the equation (3), and the equation (4) is solved regarding values corresponding to the numerators of the above deleted terms to be "0". For example, if the relations of Ex–Sx=0, Ey–Sy=0 are established in the equation (3), an absolute value of the distributive shift amount $\Delta Uz$ can be obtained from $\Delta Uz$= F$\Delta T$ which is a modified form of the equation (4). Its sign is dependent on whether the result of Ez–Sz is plus or minus.

Furthermore, when the processing is to be accompanied by varying rotational angles of the axes B and C, it is required to rotate the axes b and C synchronously with interpolation of each axis of linear shift axes X, Y and Z. To this end, their pulse distribution has to be accomplished simultaneously with the pulse distribution of each axis of X, Y and Z.

Here, assume that "Sb" and "Sc" represent rotational positions (angles) of the axes B and C at the start point S of the shift command, which are respectively given by the machining program. Similarly, "Eb" and "Ec" represent rotational positions (angles) of the axes B and C at the end point E of the shift command.

To accomplish the pulse distribution of the axes B and C simultaneously with the pulse distribution of the axes X, Y and Z, a term having a denominator whose absolute value is maximum is taken to consider its denominator as Ei–Si and its numerator as $\Delta Ui$. Then, the distributive shift amount $\Delta B$ of the axis B and the distributive shift amount $\Delta C$ of the axis C are determined to satisfy the following equation.

$$\frac{\Delta Ui}{Ei - Si} = \frac{\Delta B}{Eb - Sb} = \frac{\Delta C}{Ec - Sc} \quad (5)$$

The reason why the term having a denominator whose absolute value is maximum is chosen from the equation (3) to obtain the equation (5) is primarily to avoid selecting a term having a denominator value of "0" and secondly to improve the accuracy of calculation. If calculation accuracy is not required, any term can be chosen from the equation (3) to obtain the equation (5) as long as its denominator is not "0". That is, the position data (Sx, Sy, Sz) and (Ex, Ey, Ez) of the start and end points of the shift command and the command shift speed F of the tool are based in determining the distributive shift amounts $\Delta Ux$, $\Delta Uy$ and $\Delta Uz$ of respective linear shift axes X, Y and Z per predetermined period by solving the equations (3) and (4). Then, the distributive shift amounts $\Delta B$ and $\Delta C$ of respective rotational axes B and C per predetermined period are obtained based on the relationship between the Ei–Si, i.e. a maximum value among shift distances by the shift command for respective linear shift axes and a distributive shift amount $\Delta Ui$ of the linear shift axis per predetermined period, the rotational positions (angles) Sb and Sc of the rotational axes B and C at the start point of the shift command, and the rotational positions (angles) Eb and Ec of the rotational axes B and C at the end point of the shift command.

In the same manner as in the equation (3), if either the result of Eb–Sb or Ec–Sc is "0" in the equation (5), a term having a corresponding denominator is deleted.

However, even if these distributive shift amounts $\Delta Ux$, $\Delta Uy$, $\Delta Uz$, $\Delta B$ and $\Delta C$ of the axes X, Y, Z, B and C per distribution period ΔT are directly outputted, as they are, to respective axes at every distribution period ΔT, it is not possible to move the tool tip at the command shift speed F. It is also impossible to make the position of the tool tip at the end point coincide with the position designated by the program. This is because the distributive shift amounts ΔUx, ΔUy, ΔUz of the linear shift axes X, Y and Z are determined without considering the change of attitude of the tool, but the rotational axes B and C actually rotate by ΔB and ΔC respectively per predetermined period ΔT, thereby causing the tool tip to deviate by ΔA from a reference point of the rotational center G of the rotary head.

For example, if it is assumed that the present position of the tool tip is at point "P" in FIG. 4, and the tool is shifted by an amount ΔU=(ΔUx, ΔUy, ΔUz) only in the directions of axes X, Y and Z during the predetermined period ΔT, the tool tip will reach to a point "Q" after the predetermined period ΔT, thereby securing the shift position Q by the predetermined shift speed F and the pulse distribution, i.e. a shift amount (corresponding to F) per unit time ΔT represented by the numerator of the equation (4) and a position (corresponding to Q) on a straight line connecting the start point S and the end point E. Actually, however the axes B and C rotate respectively by ΔB and ΔC during this time period, so that the tool tip moves to point R after the predetermined period ΔT has elapsed. As a result, a positional deviation ΔA is generated between the point P and the desired shift position Q. That is, the shift amount of the tool tip per unit time ΔT will not agree with the shift amount per unit time ΔT represented by the numerator of the equation (4) due to presence of the positional deviation ΔA. Accordingly, the predetermined shift speed F cannot be maintained, and the desired shift position Q is not secured either.

Thus, it becomes necessary to add a shift amount necessary for canceling the positional deviation ΔA caused by the rotation of respective axes B and C to the distributive shift amount ΔU in each of the directions of the axes X, Y and Z.

Then, assuming that the rotational angles of the axes B and C are "B" and "C" respectively, let us consider a function fx (B, C) representing an X-axis component of the tool tip position, a function fy (B, C) representing a Y-axis component of the tool tip position, and a function fz (B, C) representing a Z-axis component of the tool tip position, in the coordinate system having the origin at the rotational center G of the rotary head which is considered as an inertial system.

Next, assuming that the rotational positions (angles) of the axes B and C are "B" and "C" respectively when the tool tip positions on the point P in FIG. 4, and the rotational positions (angles) of the axes B and C are "B+ΔB" and "C+ΔC" respectively after the predetermined period At has elapsed, it is considered that the positional deviation ΔA is generated at the tool tip position in the inertial system by the rotations ΔB and ΔC of the axes B and C.

Thus, a shift amount ΔV for canceling this positional deviation ΔA is obtained from the following equations (6) to (8) with respect to each axis component of the inertial system, i.e. each of ΔVx, ΔVy, ΔVz which are X, Y and Z components of the shift amount ΔV.

$$\Delta Vx = fx\ (B+\Delta B,\ C+\Delta C) - fx\ (B,\ C) \quad (6)$$

$$\Delta Vy = fy\ (B+\Delta B,\ C+\Delta C) - fy\ (B,\ C) \quad (7)$$

$$\Delta Vx = fz\ (B+\Delta B,\ C+\Delta C) - fz\ (B,\ C) \quad (8)$$

In this embodiment, the distance from the rotational center G of the rotary head to the tool tip is "H", and the rotational axis B allows the tool to rotate about a horizontal axis passing through the base of the tool, while the rotational axis C allows the tool to rotate about a vertical axis passing through the base of the tool. Thus, substantial contents of fx, fy and fz are expressed by the following equations (9), (10) and (11).

$$fx(B,\ C) = H\sin(B) \times \cos(C) \quad (9)$$

$$fy(B,\ C) = -H\sin(B) \times \sin(C) \quad (10)$$

$$fz(B,\ C) = H\cos(C) \quad (11)$$

Values of ΔVx, ΔVy and ΔVz are obtained from the following equations:

$$\Delta Vx = H \times [\sin(B+\Delta B) \times \cos(C+\Delta C) - \sin(B) \times \cos(C)] \quad (12)$$

$$\Delta Vy = -H \times [\sin(B+\Delta B) \times \sin(C+\Delta C) - \sin(B) \times \sin(C)] \quad (13)$$

$$\Delta Vz = H \times [\cos(B+\Delta B) - \cos(B)] \quad (14)$$

Accordingly, to the referential distribution amount ΔU=(ΔUx, ΔUy, ΔUz, ΔB, ΔC), which is dependent on the distributive shift amounts ΔUx, ΔUy and ΔUz obtained from the equations (3) and (4) and the distributive shift amounts ΔB and ΔC obtained from the equation (5), a distribution amount ΔV=(ΔVx, ΔVy, ΔVz) obtained from the equations (12), (13) and (14) is added for each axis for canceling positional deviation, and a final distributive shift amount, i.e. a corrected distribution amount ΔP=(ΔUx +ΔVx, ΔUy +ΔVy, ΔUz +ΔVz, ΔB, ΔC) is outputted to each axis at every predetermined period ΔT, whereby the shift amount of the tool tip in the direction of respective axes X, Y and Z in each period can be made to coincide with ΔUx, ΔUy and ΔUz. Thus, it becomes possible to move the tool tip along a straight line connecting the start point S and the end point E at the command shift speed F designated by the program in the same manner as in the normal linear interpolation which is not accompanied by the rotation of axes B and C.

Figure 2:
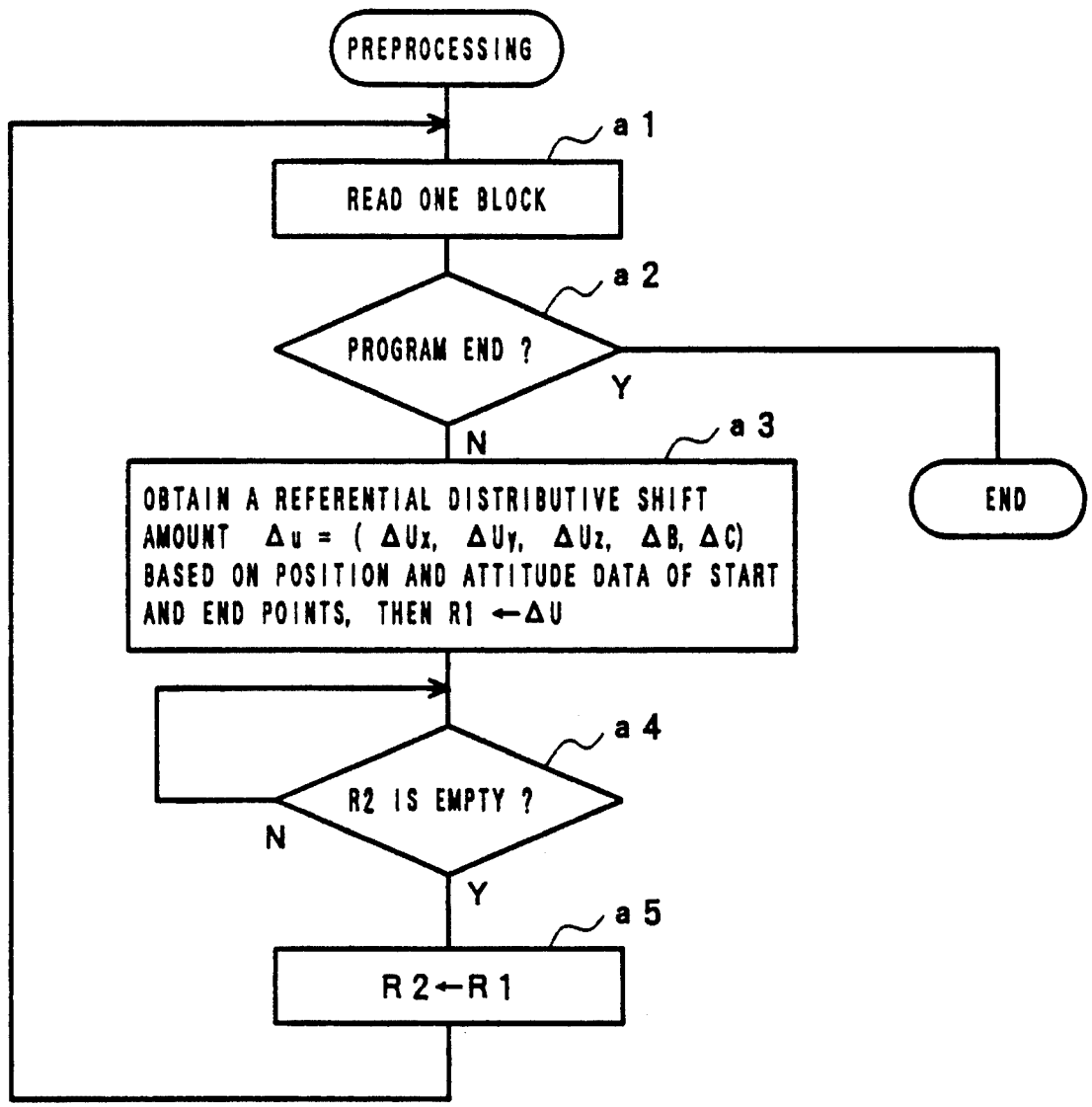
FIG. 2 is a flowchart schematically showing preprocessing of the pulse distribution processing of the numerical control apparatus in accordance with the one embodiment of the present invention.
Figure 3:
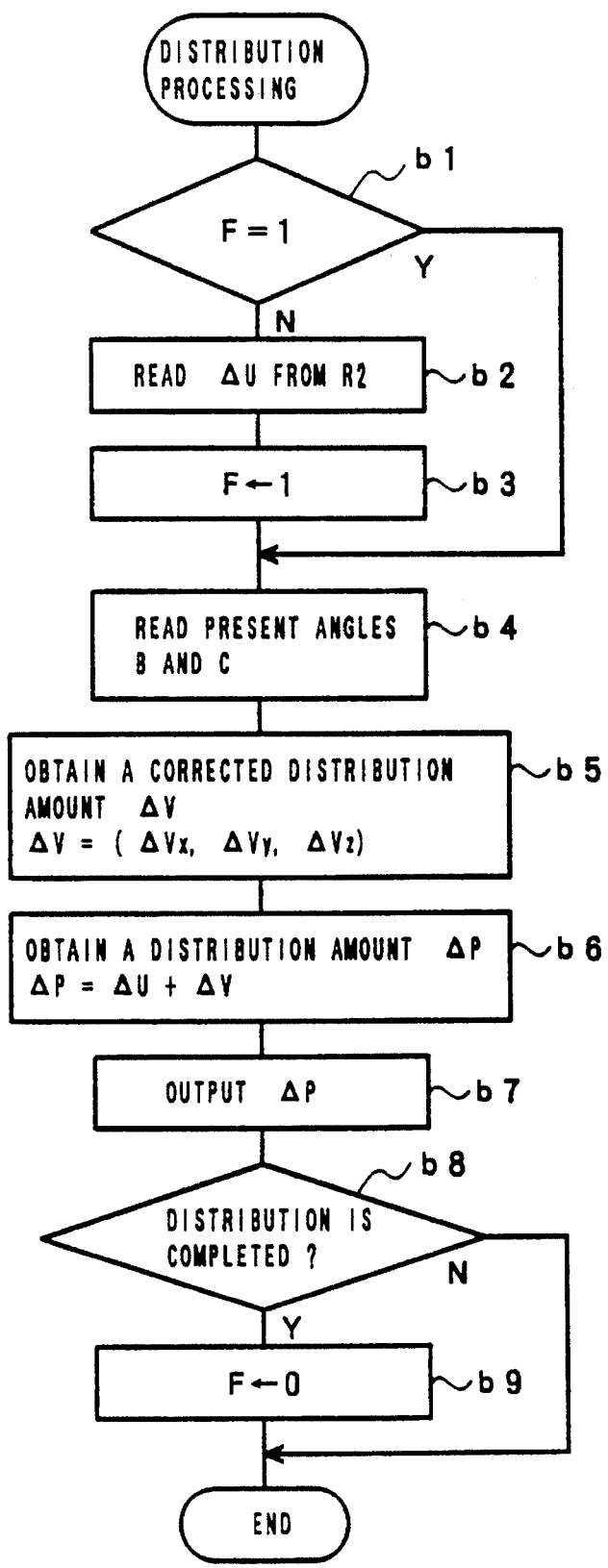
FIG. 3 is a flowchart schematically showing the pulse distribution processing of the numerical control apparatus in accordance with the one embodiment of the present invention.

FIGS. 2 and 3 are flowcharts schematically showing the procedure adopted by the numerical control apparatus 10 of this embodiment in order to execute the pulse distribution processings for individual axes using previously described equations. Among them, the processing shown in FIG. 2 chiefly relates to a preprocessing for the pulse distribution, and is carried out utilizing a time available after higher-priority processing, such as the pulse distribution processing, are completed. The processing shown in FIG. 3 relates to the pulse distribution processing repeatedly executed at every predetermined period ΔT. Both are executed by the processor 11 based on the system program stored in the ROM 12.

The processor 11, having started the automatic operation processing by the machining program, first outputs a rotational speed command to the spindle control circuit 60 under predetermined conditions to make a tool attached to the rotary head start rotating for a cutting operation, reads in one block of the machining program stored in the CMOS memory 14 (Step a1), and then judgement is made as to whether this block corresponds to the program end or not (Step a2). If this block is not one including the program end, the processor reads, from one block of shift command, the coordinate values S=(Sx, Sy, Sz) and E=(Ex, Ey, Ez) respectively representing the start point S and the end point E of the shift command; the command shift speed F of the tool tip programmed in accordance with this shift section; the rotational positions (angles) Sb and Sc of the axes B and C at the start point S of the shift command, and the rotational positions (angles) Eb and Ec of the axes B and C at the end point E of the shift command. Based on these read values, simultaneous equations (3) and (4) are solved to obtain each of the distributive shift amount $\Delta Ux$, $\Delta Uy$ and $\Delta Uz$ of the axes X, Y and Z as a result of the linear interpolation applied between the start point S and the end point E based on the table shift using only three axes of linear shift axes X, Y and Z. Furthermore, by solving the equation (5) on the basis of the relationship between the Ei–Si, i.e. a value of a denominator whose absolute value is maximum in the equation (1), and its numerator $\Delta Ui$, the distributive shift amounts $\Delta B$ and $\Delta C$ of the respective rotational axes B and C are obtained. Then, a set of these values $\Delta Ux$, $\Delta Uy$, $\Delta Uz$, $\Delta B$ and $\Delta C$ is stored in the register R1, which is for storing the next candidate data (Step a3), as reference distributive amounts of movement.

Next, the processor 11 makes a judgement as to whether a register R2 for storing execution data is empty or not (Step a4). As the execution data storing register R2 is empty at the time immediately after the first one block is read, the content of the next candidate data storing register R1, i.e. the referential distributive shift amount $\Delta U=(\Delta Ux, \Delta Uy, \Delta Uz, \Delta B, \Delta C)$ calculated in response to the first shift command, will be stored in the execution data storing register R2 (Step a5).

Then, the processor 11 returns to the step a1 to read the next one block from the machining program stored in the CMOS memory 14. Then, the processor 11 executes the processing for judgement the step a2 in the same manner as in the previous cycle. If the block of the present cycle does not indicate the program end, the processor 11 executes the processing of the step a3 according to the one block in the same manner as in the previous cycle, thereby obtaining the referential distributive shift amount $\Delta U=(\Delta Ux, \Delta Uy, \Delta Uz, \Delta B, \Delta C)$ of respective axes corresponding to the present one block, i.e. the second shift command block in the machining program. Then these data are stored in the next candidate data storing register R1 (Step a3)

Next, the processor 11 makes a judgement as to whether the execution data storing register R2 is empty or not (Step a4). As the execution data storing register R2 already stores the referential distributive shift amount $\Delta U=(\Delta Ux, \Delta Uy, \Delta Uz, \Delta B, \Delta C)$ of respective axes corresponding to the first shift command block, the judgement result of the step a4 becomes false ("N").

Accordingly, execution of the processing of the step a5, i.e. the processing for transferring the content of the next candidate data storing register R1 to the execution data storing register R2, is prohibited, and the processor 11 enters a waiting condition in the preprocessing execution stage.

As already described, the processor 11 executes the above-described preprocessing during the time period unoccupied by the higher-priority processing; therefore, if the execution of the preprocessing interrupted by other processing, the execution of the preprocessing is temporarily suspended, and a step number corresponding to the interrupted position is stored. While the other processing is executed, the content of the registers R1 and R2 are held. Thus, the processor resumes the preprocessing from the interrupted position as soon as empty time becomes available. The execution data storing register R2 reads the referential distributive shift amount $\Delta U$ through the later-described pulse distribution processing, and is initialized to be emptied at the time the pulse distribution processing is started with respect to the shift command of the present one block. Furthermore, initialization of the execution data storing register R2 causes the prohibition of executing the step a5 to be canceled. Then, the referential distributive shift amount $\Delta U$, previously stored in the next candidate data storing register R1 in the step a3, is written into the resister R2. Consequently, the execution data storing register R2 stores a referential distributive shift amount $\Delta U$ corresponding to a shift command which is one block ahead with respect to the block by which the present pulse distribution processing is in progress.

The processor 11, having started the pulse distribution processing for each predetermined period $\Delta T$, first makes a judgement as to whether a flag F to prohibit reading a distribution data is set or not (F=1), that is, whether the distribution processing for executing a shift command given by one block of the machining program is completely finished or not (Step b1). As the flag F is maintained in a reset condition (F=0) at the stage immediately after the program started its operation, the judgement result of the step b1 becomes false ("N"). Thus, the processor 11 reads and temporarily stores the value of the referential distributive shift amount $\Delta U$ stored in the execution data storing register R2, i.e. the referential distributive shift amount $\Delta U=(\Delta Ux, \Delta Uy, \Delta Uz, \Delta B, \Delta C)$ of respective axes corresponding to the first shift command block, and empties the content of the register R2 by initializing (Step b2). Then, the distribution data read-in prohibiting flag F is set (Step b3).

Next, the processor 11 reads the present values of the rotational positions (angles) B, C of the axes B and C from the present position storing registers of the axes B and C (Step b4). Then, the processor 11 solves the equations (12), (13) and (14) on the bases of these data, 10 the tool length H, and the referential distributive shift amounts $\Delta B$ and $\Delta C$ of the axes B and C read in the step b2, thereby calculating the shift amount $\Delta V=(\Delta Vx, \Delta Vy, \Delta Vz)$ of respective linear shift axes X, Y and Z which is required for eliminating the positional deviation occurring at the tool tip due to the rotation of the axes B and C during the predetermined period $\Delta T$ (Step b5). Then, to the referential distributive shift amount $\Delta U=(\Delta Ux, \Delta Uy, \Delta Uz, \Delta B, \Delta C)$ temporarily stored in the processing of the step b2, the shift amount $\Delta V$ in each axis is added, thus obtaining the corrected distributive shift amount $\Delta P=(\Delta Ux+\Delta Vx, \Delta Uy+\Delta Vy, \Delta Uz+\Delta Vz, \Delta B, \Delta C)$ (Step b6). Distribution pulses corresponding to the distributive shift amounts $\Delta Ux+\Delta Vx$, $\Delta Uy+\Delta Vy$, $\Delta Uz+\Delta Vz$, $\Delta B$ and $\Delta C$ of respective axes are outputted to the axis control circuits 30, 31, 32, 33 and 34 of respective axes X, Y, Z, B and C (Step b7). Then, the processor 11 shifts the tool tip along a straight line connecting the start point S and the end point E at the command shift speed F designated by the present block of the machining program.

Next, the processor 11 reads in the values of the present position storing resisters of respective axes to check whether the pulse distribution by the present one block of the program is completed or not, that is, whether the tool tip has already reached the end point E=(Ex, Ey, Ez) designated by the present one block of the machining program (Step b8). If the pulse distribution by the one block is not finished, the pulse distribution processing of the present processing cycle is finished. Thereafter, the processings of the step b4 to b8 are repeated at every predetermined distribution period $\Delta T$ until the judgement result of the step b8 becomes true ("Y") and therefore the pulse distribution of the one block is completed, thereby moving the tool tip along the straight line connecting the start point S and the end point E at the command shift speed F designated by the present block of the machining program.

Each time the pulse distribution processing by the one block of the program corresponding to the executed shift command is completed, and the judgement result of the step b8 turns true ("Y"), the processor 11 resets the distribution data read-in prohibiting flag F (Step b9). In the pulse distribution processing in the next cycle, the processor 11 reads in the referential distributive shift amount ΔU corresponding to the next block of the machining program stored in the execution data storing register R2 (Steps b1 and b2), sets the distribution data read-in prohibiting flag F again (Step b3), and obtains the corrected distributive shift amount ΔP in the same manner as in the previous cycle, thereby repeatedly executing the pulse distribution processing corresponding to the shift command of the present one block at every predetermined period ΔT.

Described in the foregoing is the embodiment of the present invention on the speed control of a machine tool comprising the axes B and C for rotating the rotary head and the linear shift axes X, Y and Z. The speed control method of the present invention is applicable to machine tools which execute the machining processes by changing a relative angle between the tool and the workpiece by changing a rotational angle or a tilting angle of the table, as well as to all the machine tools which can resolve the positional deviation occurred between the tool tip and the workpiece caused only by mutual angular change between the tool and the workpiece into shift amounts of respective linear shift axes, i.e. all the machine tools capable of obtaining the values of ΔVx, ΔVy and ΔVz in the equations (6), (7) and (8) using specific functional equations.

As described in the foregoing, in the speed control method of the present invention, the distributive shift amounts of respective linear shift axes are obtained as a result of the linear interpolation executed at every predetermined period based on only the linear shift axes in response to a shift command regardless of angular change of the tool; the distributive shift amounts of respective rotational axes for changing the angle of the tool per the predetermined period is calculated in response to the number of times of interpolation; further, a positional deviation occurred at the tool tip in the direction of respective linear shift axes due to distributive shift amounts of the respective rotational axes is determined at every predetermined period, during 10 the time before the next predetermined period comes; interpolation is made for each of the linear shift axes by correcting the distributive shift amount of each linear shift axis based on the positional deviation at every predetermined period; and directly outputs to each rotational axis the distributive shift amount obtained in accordance with the number of times of interpolation, i.e. the distributive shift amount causing a positional deviation at the tool tip by the angular change of the tool. Hence, even if the linear interpolation is carried out changing the tool angle relative to the workpiece, it becomes possible to equalize the shift speed of the tool tip with the given shift command speed in the same manner as in the linear interpolation based on the linear shift axes only.

We claim:

1. A speed control method for a numerical control apparatus of a machine tool which includes a rotational axis or axes changing a tool angle relative to a workpiece, comprising the steps of:

obtaining a distributive shift amount of each said rotational axis of said machine tool, at every predetermined period, on the basis of positional data of each said rotational axis with respect to start and end points of a shift command and a commanded shift speed;

obtaining, at every said predetermined period, a positional deviation of a tip of said machine tool in a direction of each linear shift axis with reference to said rotational axis, based on a difference between a rotational position of the rotational axis in a next cycle and a rotational position of the rotational axis in a present cycle;

for each said linear shift axis, adding the positional deviation to the corresponding distributive shift amount, and outputting a resultant value as a corrected distributive shift amount for each said linear shift axis; and for each said rotational axis, outputting said obtained distributive shift amount.

2. The speed control method for a numerical control apparatus in accordance with claim 1, wherein, after said distributive shift amount of each said linear shift axis at every said predetermined period is obtained based on the positional data of the start and end points of the shift command and the command shift speed, a distributive shift amount of each said rotational axis at every said predetermined period is obtained based on a relationship between a shift distance of the shift command in the direction of one linear shift axis and a distributive shift amount of said linear shift axis at every said predetermined period, and rotational positions of the rotational axis at the start and end points of the shift command.

3. A speed control method for a numerical control apparatus of a machine tool having a tool tip using at least one linear shift axis and at least one rotational axis, comprising the steps of:

(a) executing a linear interpolation based on a coordinate value on each said linear shift axis of the tool tip and a rotational angle of each said rotational axis at a start point of a shift command, a coordinate value on each said linear shift axis of the tool tip and a rotational angle of each said rotational axis at an end point of the shift command, and a command shift speed in a section defined by said start point and said end point which are given by one block of a machining program, thereby obtaining a distributive shift amount of each said linear shift axis of said tool tip and a distributive rotational amount of each said rotational axis of said machine tool in advance;

(b) reading a rotational angle of said rotational axis in a present cycle, calculating an amount by which the tool tip is to be displaced in a direction of each said linear shift axis with respect to a rotational center of said rotational axis if said read rotational angle varies in a next cycle by an amount equal to said obtained distributive rotational amount, and obtaining a correction amount for each said linear shift axis required to cancel said amount of displacement;

(c) in the next cycle, outputting a distribution pulse equivalent to the sum of the obtained distributive shift amount and the obtained correction amount, for each said linear shift axis, while outputting a distribution pulse equivalent to the obtained distributive rotational amount for each said rotational axis, thereby controlling the tool tip in such a manner that the speed commanded by the machining program agrees with an actual speed of the tool tip at a machining point.

4. The speed control method for a numerical control apparatus in accordance with claim 2, wherein said numerical control apparatus controls said machine tool equipped with a rotary head including a first rotational axis allowing said machine tool to rotate about a horizontal axis passing through a base of the machine tool and a second rotational axis allowing the machine tool to rotate about a vertical axis passing through the base end of the machine tool, further comprising the steps of:

considering "H" as a distance from said rotational center of the rotary head to a tool tip, "B" as a rotational position of said first rotational axis in a present cycle, "C" as a rotational position of said second rotational axis in the present cycle, "ΔB" as a distributive shift amount of the first rotational axis at every the predetermined period, and "ΔC" as a distributive shift amount of the second rotational axis at every predetermined period; and using the following equations:

$$\Delta Vx = H \times [\sin(B+\Delta B) \times \cos(C+\Delta C) - \sin(B) \times \cos(C)]$$

$$\Delta Vy = -H \times [\sin(B+\Delta B) \times \sin(C+\Delta C) - \sin(B) \times \sin(C)]$$

$$\Delta Vz = H \times [\cos(B+\Delta B) - \cos(B)]$$

thereby obtaining a positional deviation $\Delta Vx$ in a direction of a horizontal linear shift axis X, a positional deviation $\Delta Vy$ in a direction of a horizontal linear shift axis Y which is normal to the linear shift axis X, and a positional deviation $\Delta Vz$ in a direction of a vertical linear shift axis Z.

* * * * *